May 6, 1930.  L. G. MERRITT ET AL  1,757,092
DRYING MACHINE
Original Filed March 5, 1928    7 Sheets-Sheet 1
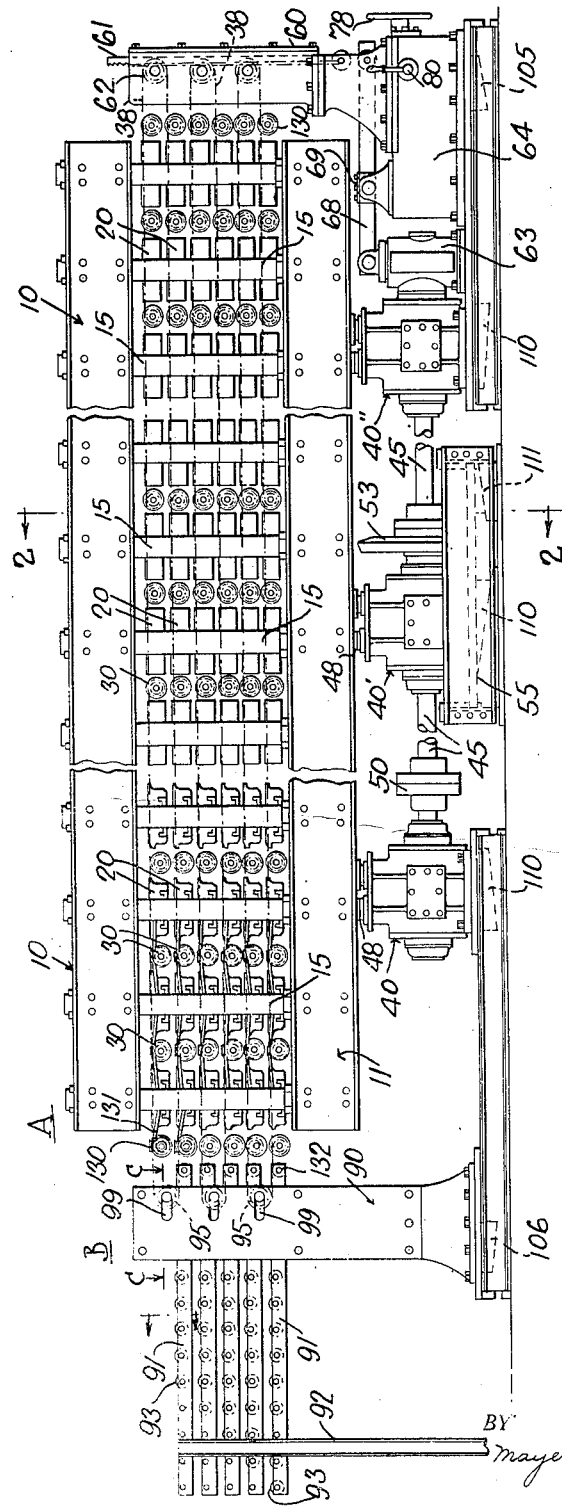
INVENTOR.
Louis G. Merritt
Ericsson H. Merritt
Richard W. Stanley
BY Mayer, Warfield & Watson
ATTORNEYS.

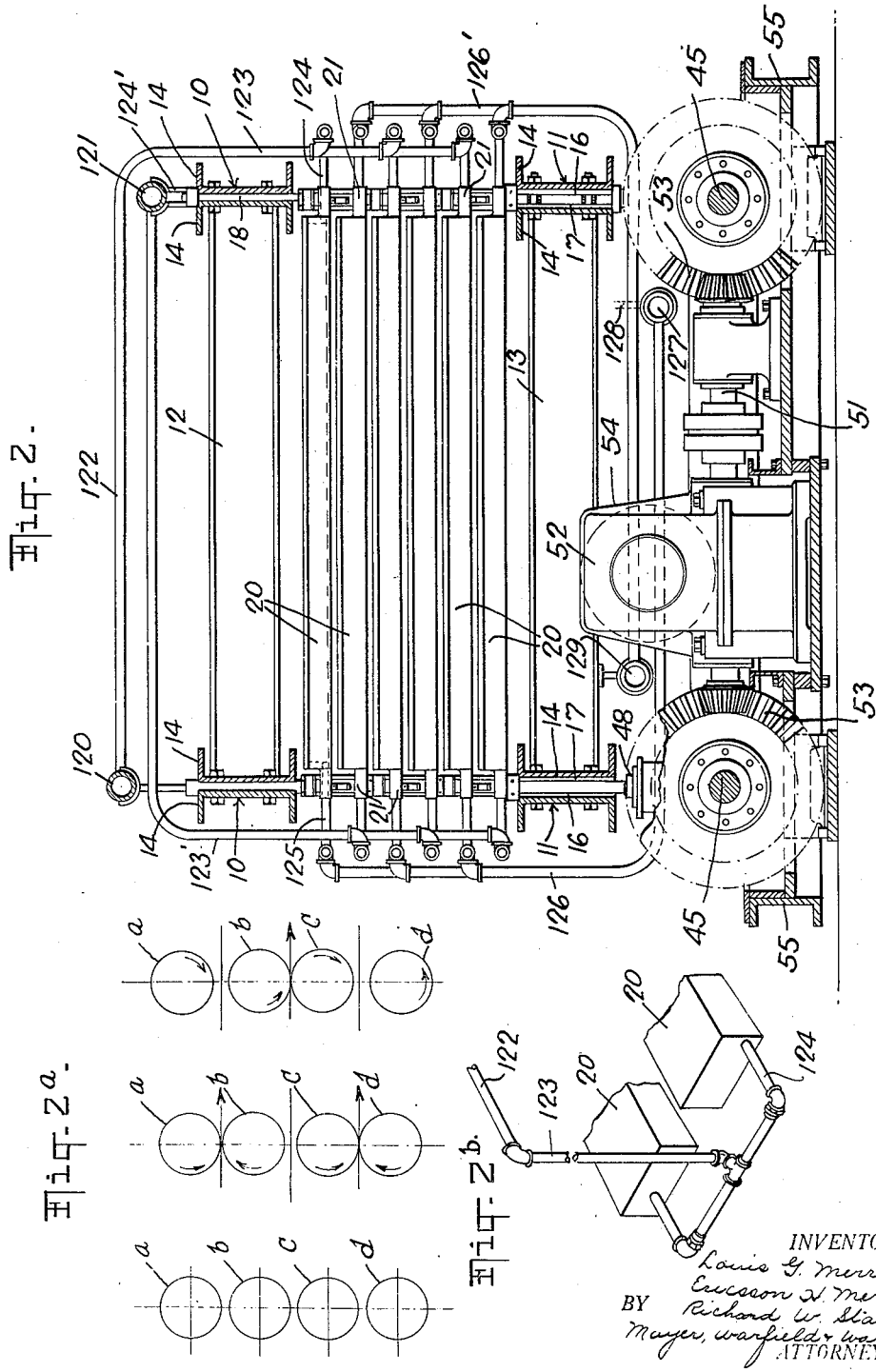

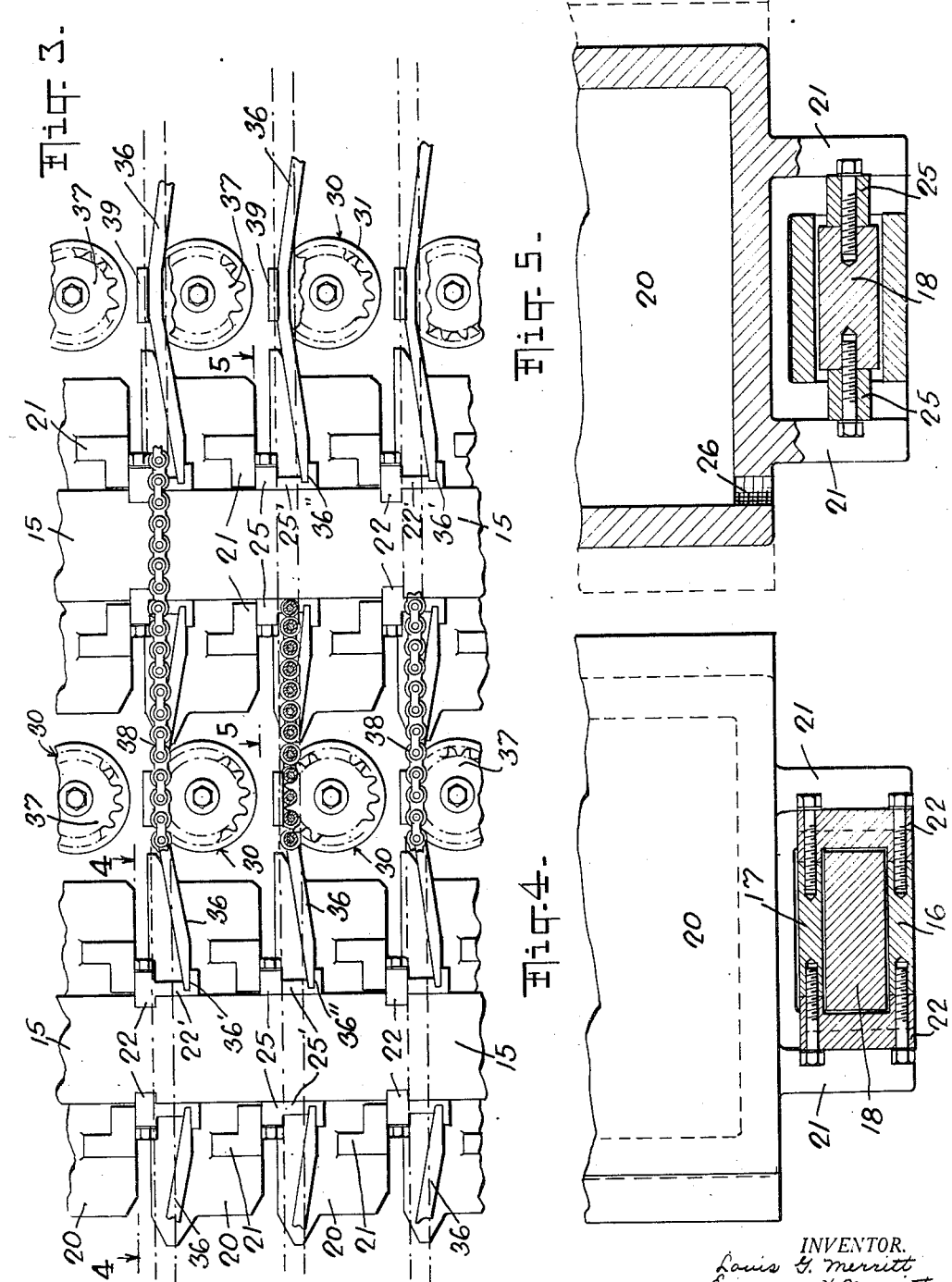

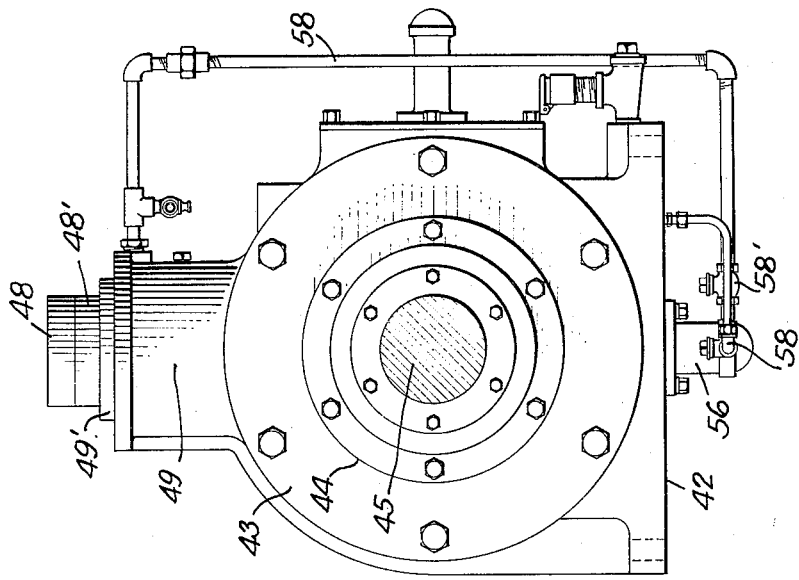
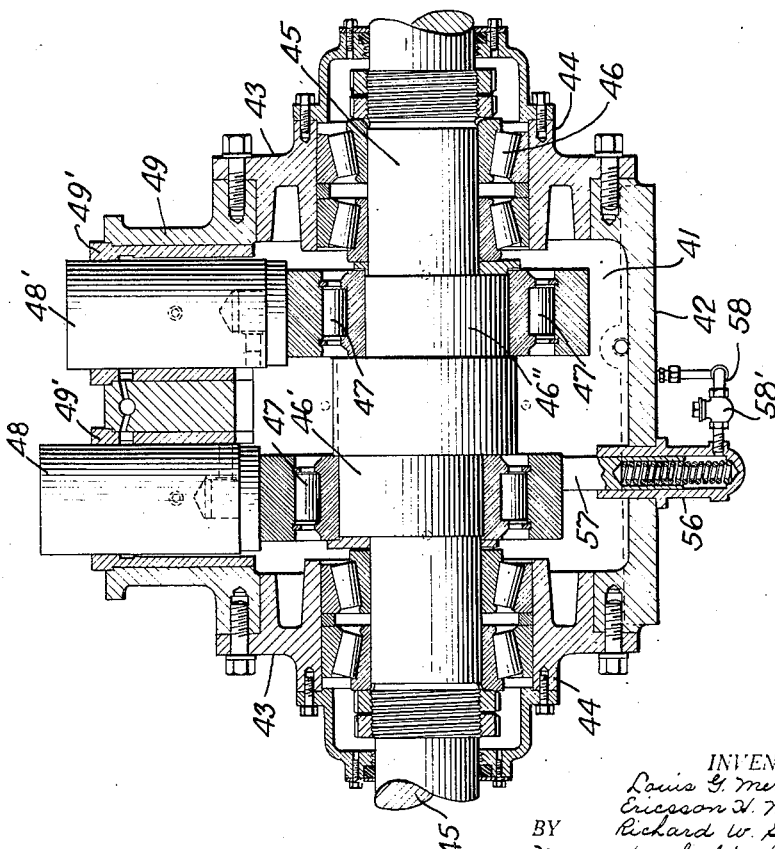

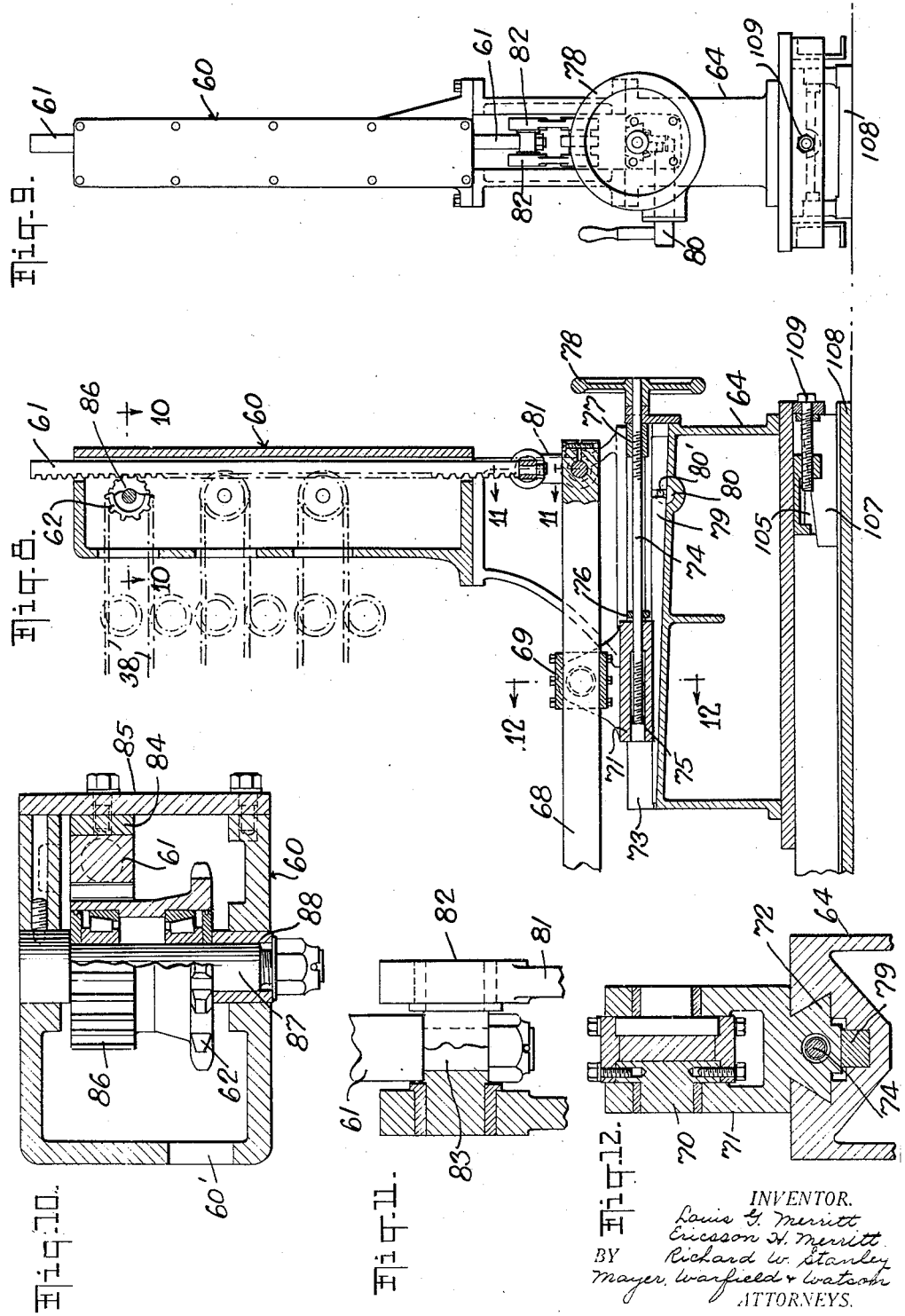

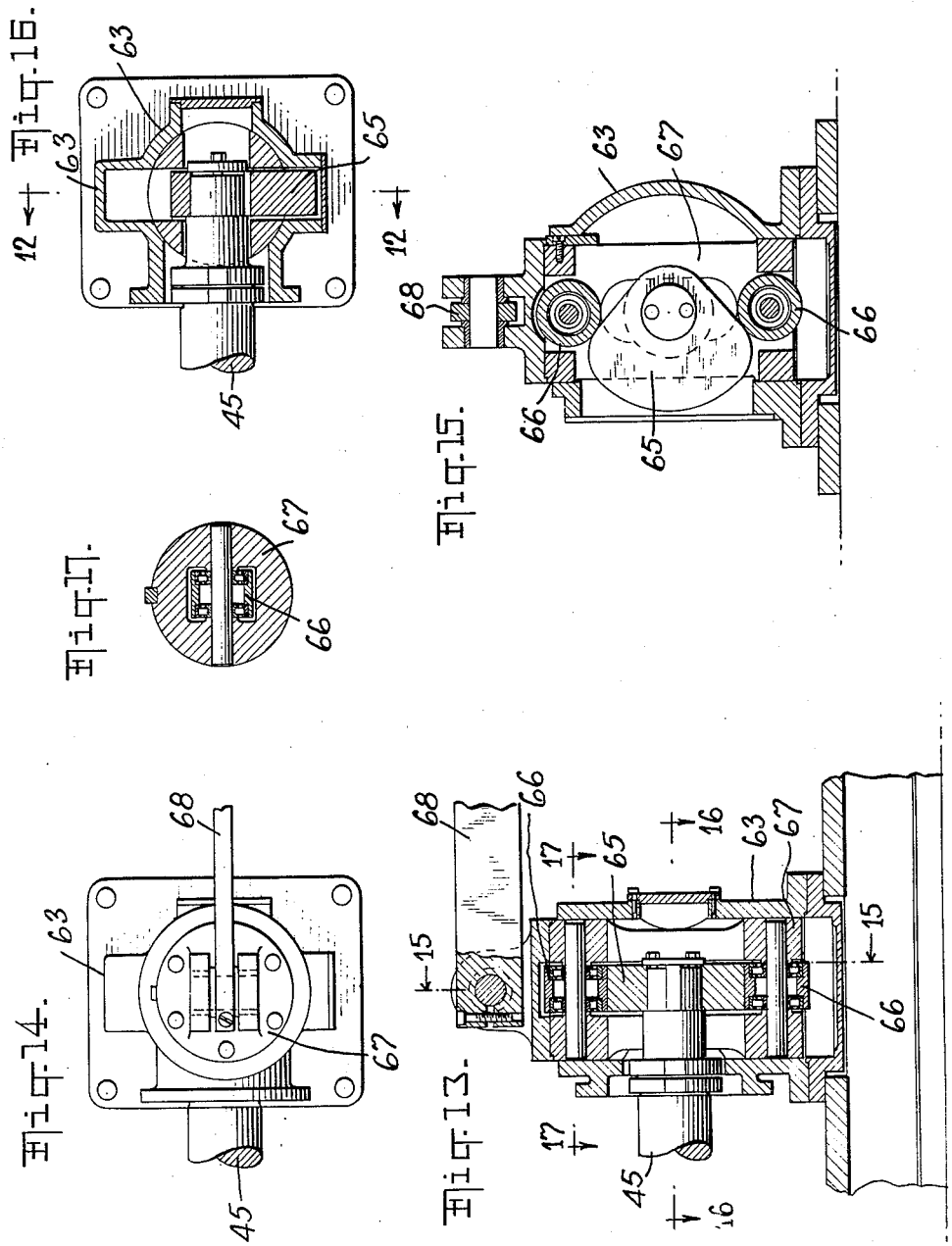

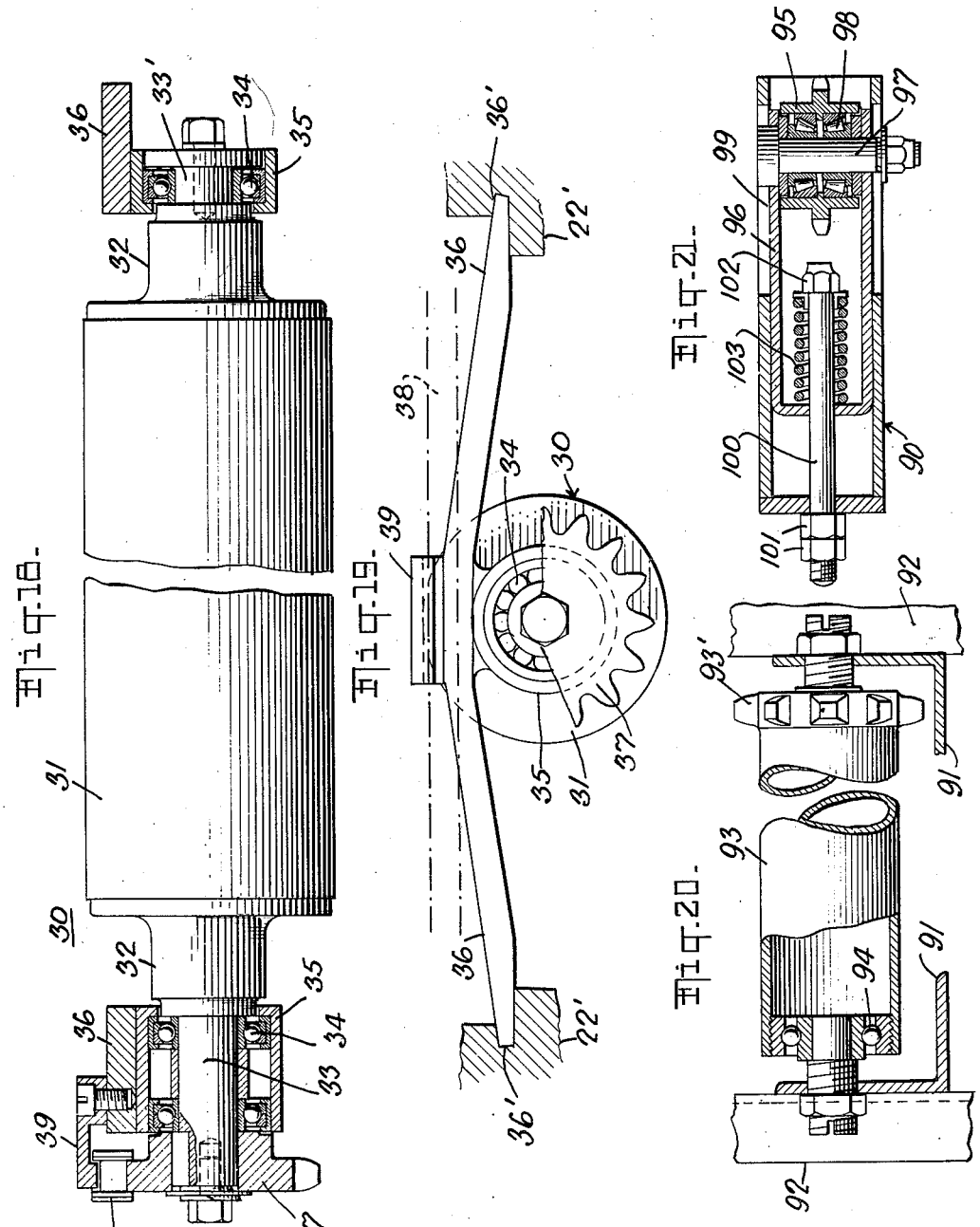

Patented May 6, 1930

1,757,092

UNITED STATES PATENT OFFICE

LOUIS G. MERRITT, ERICSSON H. MERRITT, AND RICHARD W. STANLEY, OF LOCKPORT, NEW YORK, ASSIGNORS TO SAID LOUIS G. MERRITT

DRYING MACHINE

Application filed March 5, 1928, Serial No. 259,106. Renewed March 13, 1930.

This invention relates to drying machines, and more particularly to machines for the progressive drying of sheet material when passed in one direction.

This invention has for its object generally to provide an improved construction and arrangement of parts, which is efficient, economical and readily manufactured.

More particularly, an object of the invention is to provide a drying machine for drying sheet material continuously and progressively, all the material being passed in one direction.

A further object of the invention is to provide a drying machine of the general character shown in United States Letters Patent to Merritt No. 1,578,841 and to Barray et al. No. 1,598,191, which incorporates the principles of operation embodied in the machines of these patents, and at the same time, dispenses with the movement of sheet material in two different directions.

Other objects of the invention will in part be obvious and will in part appear hereinafter.

The invention accordingly comprises the features of construction, combination of elements and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawing, in which:

Figure 1 is a view in side elevation showing a drying machine, parts being broken away and other parts being omitted, (in the interest of clearness) which is constructed in accordance with the invention;

Fig. 2 is a sectional view showing the machine, taken on the line 2—2 of Fig. 1, while Figs. 2ª and 2ᵇ are explanatory diagrams;

Fig. 3 is an enlarged fragmentary view mainly in elevation, but partly in section showing details of the platens and feed rollers employed in the machine shown in Fig. 1;

Figs. 4 and 5 show, respectively, fragmentary views, partially in plan and partially in section, of the ends of the platens shown in Fig. 3;

Fig. 6 is an enlarged sectional view showing details of the platen-lifting mechanism employed by the dryer shown in Fig. 1, while Fig. 7 is an end view of the same;

Fig. 8 is a view, partially in section and partially in elevation, of the pedestal shown at the right-hand end of the machine in Fig. 1;

Fig. 9 is an end elevation of the pedestal shown in Fig. 8, while Figs. 10, 11 and 12 are fragmentary sectional views, showing details in the pedestal construction, these views being taken respectively on the section lines 10—10, 11—11 and 12—12 of Fig. 8;

Fig. 13 is a sectional view of the roller-actuating mechanism associated with the pedestal shown in Fig. 8;

Fig. 14 is a top plan view of the same mechanism, while Fig. 15 is a vertical section taken on the line 15—15 of Fig. 13; Figs. 16 and 17 being horizontal sections taken on the respective lines 16—16 and 17—17 of Fig. 13;

Fig. 18 is a view, partly in section and partly in elevation, parts being broken away, showing the construction of the feed rollers employed herein;

Fig. 19 shows a detail of the mounting for the same;

Fig. 20 is a fragmentary view, partially in section and partially in elevation, showing details of the rollers employed in the sheet-supplying device shown at the left of the drying machine in Fig. 1; and Fig. 21 is a sectional view showing details of the tensioning mechanism employed in the sheet-supplying device, the latter section being taken in line c—c in Fig. 1.

In the practice of the present invention, the drying machine is designed to have fed progressively but intermittently therethrough the sheet-material to be dried, and to this end has a frame A, as shown in Fig. 1, for supporting the drying mechanism proper, this frame having upper and lower members which are arranged to move relatively toward and from each other for operating the drying mechanism. This machine is arranged to have the sheet-material being dried advance in only one direction (shown in Fig. 1 as from left to right); to this end a sheet-feeding device or table B is shown disposed at the left-hand or intake end of the machine, while the other end serves as the discharge end.

The frame, in order to execute the movement described, is provided with lifting means, the advance of the sheet-material through the machine being effected by suitable feeding means, both of which means have suitable actuating means, all as hereinafter described.

The frame

In Fig. 1, 10 denotes a top-beam or girder, and 11 a bottom beam or girder which beams are united respectively by cross-beams 12 and 13 with similar top-and-bottom beams to form upper and lower structures or frame members adapted for relative movement as described.

The beams 10 and 11 may be of any convenient construction, for example, the two-part construction shown in Fig. 2, where they are shown as composed of channel members 14 disposed in back-to-back relation and have secured therebetween supporting posts 15, which are disposed at intervals and rise vertically between the top-and-bottom beams.

The supporting posts here employed are not solid but are of a laminar or parallel plate construction, three plates being employed in the post-construction here shown. These plates have the same width and are superposed so that from the side they appear as one, as shown in Fig. 3. Their laminar character, however, appears in Figs. 4 and 5, where the outside posts for the plates are shown respectively at 16 and 17, while the inner plate or core is shown at 18. The outside plates 16 and 17 of each post are secured to the bottom beam members, independently of the core 18 which latter is secured in the top beam. This arrangement of the post construction permits the cores to slide between the outside plates so that the portion of the frame comprising the top beams can be moved toward and from the portion of the frame comprising the bottom beams, and permits the upper and the lower frame members to be given simultaneous and opposite vertical movement. This movement of the drying machine occurs at regular intervals, and may be likened to a "breathing" action which takes place between successive movements of the material being dried through the dryer, this vertical and opposite movement of the frames being accomplished by the lifting means described below.

The means proper for drying the sheet-material and the means for feeding the same through the machine are both carried by the frame, the former comprising a plurality of heated plates or platens 20 which are arranged in groups or vertical banks, each bank being secured at its ends between a pair of posts 15, one on each side of the frame. These platens preferably comprise massive metal bodies having plain upper and lower surfaces, the platens being arranged to extend the full width of the machine. The successive platens in each bank are secured alternately to the inside and outside plates of the posts 15, respectively. By this arrangement the alternate platens in a vertical bank receive the opposite vertical movements imparted by the top and bottom beams, respectively, when in motion; this permits the platens of any one bank to operate alternately upon the strips of sheet material being passed through the drying machine when the upper and lower frame members have moved, respectively, to either their "near" or "far" positions. Any convenient means for so securing the platens to the posts may be employed; that here shown, by way of example, employs projections or prongs 21 formed integrally with the platens which straddle the posts 15, and have over-hung portions adapted to rest upon key-like members, one form of which is shown at 22 in Fig. 4, and another form at 25 in Fig. 5. The form shown in Fig. 4 illustrates the manner by which a set of alternate platens in a bank are secured for actuation by the outside plates of a post 15, while that illustrated in Fig. 5 illustrates the manner of securing the remaining platens of a bank to be actuated by the cores 18, the former being taken, for example, as representing the manner of securing the lowermost platen in the extreme left-hand bank, shown in Fig. 1. In such case, the key members 22 are securely bolted to the outside plates 16 and 17. The prongs 21, bearing thereon, consequently receive the motion of the outside plates, i. e., that of the bottom beam 11 of the drying machine. This mode of platen mounting applies not only to the lowermost platen in the extreme left-hand bank, but also to that of the third from the bottom, the fifth from the bottom, etc. The mode of mounting the second, fourth, etc., platens, accordingly, is that illustrated in Fig. 5; in such case the prongs 21 straddle the posts 15 and have their over-hung portions engage with the key members 25 bolted to the core plate 18.

The platens here illustrated are heated and are adapted to dry sheet-material by having the same passed between the adjacent surfaces of a pair of platens for the application of heat and pressure. The heating is effected in any convenient manner; for example, by passing therethrough a fluid-heating medium, such as live steam. Passages for this purpose are provided in the ends of the platens, for example, as shown in Fig. 5 at 26. The drying machine, accordingly, is equipped with means for supplying and withdrawing the heated medium to the platens, as will be hereinafter described.

By this arrangement it is seen that when the bottom beam is elevated to its uppermost position and the top beam moved to its lowermost position, i. e., when the frame members are in the "near" position, the lowermost or first platen in the extreme left-hand bank is in contact with the second platen, the top side of the first platen supporting the lower side of the second platen, the third platen being in contact on its top side with the underside of the fourth platen, etc.; this being the same for each bank of platens throughout the length of the machine.

When the bottom beam is moved to its lowermost position and the top beam moved to its uppermost position, i. e., when the frame members are in the "far" position, the second platen has its upper side in contact with the lower side of the third platen, the fourth platen being in contact at its upper side with the underside of the fifth platen, etc. It is seen, in consequence, that whether the frame members be in either the "near" or "far" positions, there are alternate open spaces between the platens in each bank, and since this is the same for each bank of platens throughout the entire length of the machine, there are corresponding spaces between platens in each bank for such positions.

The levels for the respective corresponding platens in the banks throughout the machine are hereinafter referred to as "decks", since each platen surface may be regarded as a continuation of the corresponding platen surfaces in another bank. The machine thus constructed is adapted to treat continuously strips of sheet-material in each of the several decks. The sheet-material in one set of alternate decks is also seen to be gripped between platen surfaces, while the sheet-material on the remaining decks is at the same time free for movement along the deck as the frame members continue in "near" or "far" positions, as the case may be.

*The feeding means*

To effect movement of the sheet material through the drying machine, feeding means are disposed between each bank of platens. The means here shown comprise a plurality of rollers 30 which, like the platens, extend the full width of the machine and partake of the vertical movements imparted to the platens so as to engage with alternate strips of sheet-material which are free in the drying machine for the purpose of advancing the same through the machine. These rollers are superposed and arranged, as it were, in banks between the banks of platens. The details of the roller construction here employed are shown in Fig. 18, while Fig. 19 shows how the rollers are supported by the posts 15 so as to impart to them the vertical movements imparted to the platens.

As shown in Fig. 18, the roller 30 comprises a cylindrical body 31 adapted to make rolling contact with the sheet-material passing through the drying machine. The cylindrical body 31 is preferably reduced at each end, as shown at 32; each end having projecting therefrom integrally-secured journal members 33 and 33'. The journal member 33' (at the right-hand end in Fig. 18) is shown as supported by means of a ball-bearing 34 in the journal housing 35 secured to and suspended from a supporting bar 36. A similar construction is employed at the other end, except that the journal is longer and the housing and bar larger, since this journal is designed to receive the driving motion to be transmitted to the roller. For this latter purpose the projecting end of the journal 33 has rigidly secured thereto a sprocket wheel 37, this sprocket wheel being actuated by a link or sprocket chain, indicated at 38. (Only an end of the link is shown in Fig. 18, the manner of engagement with the sprockets being more clearly illustrated in Fig. 3). In order to insure engagement of the chain 38 with the sprocket 37 the bar 36 is provided with a guard 39 disposed closely above the chain and rigidly secured to the bar 36.

As shown in Fig. 19, the bars 36 extend transversely of the roller and engage at each end with the posts 15. In order that the rollers may partake of the appropriate vertical movement, alternate rollers in each roller bank are associated respectively with the outside plates and cores in the posts. The rollers thus mounted are adapted to move toward and from each other as do the platens themselves, but in order that the rollers may effect the movement of the sheet-material through the drying machine, it is seen that the lower roller of a given pair for a given deck is to be supported from that portion of the post which supports a platen in the adjacent deck above. Such arrangement of the rollers is conveniently accomplished by supporting them also from the key members 22 and 25, bolted respectively to the outside plates and cores of each post, in the manner illustrated in Fig. 3. As here shown, the key member 22 which supports the uppermost platen in the left-hand bank has an extension 22' extending downwardly along the side of the outside plates of the post, which extension has a notch 36' near its lower end adapted to be engaged by and receive the end of the bar 36, which suspends a roller at the level of the platen shown second from the top in the left-hand bank shown in Fig. 3. It is thus seen that the roller, which is in a deck of platens partaking of the motion of a core member of the post, is suspended so as to partake of the motion of the outside plates of a post. Similarly, the supporting bar for the roller 39 directly opposite the platen third from the top in the left-hand bank, shown in Fig. 3, has its end supported in a notch 36" formed in a downward extension 25' of the key member 25 shown second from the top; that is, the roller which is third from the top in the roller bank, shown in Fig. 3, partakes of the motion of the platen which is second from the top in the left-hand bank. It is accordingly seen that when a pair of platens engage with sheet-material in any given deck the pair of rollers opposite to them have been moved apart so as not to engage with the sheet-material held by the platens and vice versa. The sheet-material in any deck which is not being held by the platens is engaged by the rollers. The rollers, by this arrangement, are thus adapted to effect a feeding movement of the sheet-material which is free between the platens.

In order that the rollers may effect the feeding movement of the sheet material through the machine, these rollers are actuated so as to execute oscillatory movement, i. e., they are made to rotate through a partial revolution in one direction and then reversed so as to execute a corresponding partial rotation in the other direction.

The nature of the feeding movement imparted by thus oscillating the feeding rollers will be more fully understood by reference to the explanatory diagram shown in Fig. 2ª. In the left-hand portion of this figure are illustrated a bank of rollers $a$, $b$, $c$ and $d$ spaced apart for the position of the frame members intermediate the "far" and "near" positions. In the middle column of this figure the rollers $a$ and $b$ have been moved into contact and so have the rollers $c$ and $d$. This position of the rollers corresponds to a position of the frame members when they have reached the extreme of their vertical motions, for example, that corresponding to the "near" position of the upper and lower frame members. If now the rollers $a$ and $c$ be given counter-clockwise motion, while the rollers $b$ and $d$ are given clockwise motion each through a partial revolution, it is seen that the sheet gripped between the rollers $a$ and $b$ will be advanced toward the right; similarly the sheets being gripped between the rollers $c$ and $d$ will also be advanced toward the right, while at the same time the sheet between the rollers $b$ and $c$ remains free and is accordingly not advanced. When the frame members have moved to their other extreme of vertical motion, for example, to that corresponding to the "far" position of the upper and lower frame members, the rollers $a$ and $d$ will have been moved out of contact with the rollers $b$ and $c$, respectively, these rollers themselves being moved into contact and gripping the middle sheet of material. If now the roller $b$ which was formerly rotated clockwise be now rotated counter-clockwise, and the roller $c$ which was formerly rotated counter-clockwise be now rotated clockwise, the rollers $b$ and $c$ will effect an advance toward the right of the middle sheet of material. The sheets which before were advanced are now free but the rollers $a$ and $d$ which may be in contact with other sheets of material, not here shown, will be oscillated back to their starting position. Thus the roller $a$ which was formerly rotated counter-clockwise will now be rotated clockwise, and the roller $d$ which was formerly rotated clockwise will now be rotated counter-clockwise. These clockwise and counter-clockwise motions of the respective rollers are imparted by causing the chains 38, which drive them, to execute reciprocating or limited forward and backward movement, the horizontal chain driving one set of rollers in a deck having an opposite movement to the horizontal chains directly above and beneath it. This motion of the chains is accomplished by the actuating means described below.

The lifting means

In order to accomplish the limited vertical movements imparted to the upper and lower frame members, lifting means are employed, which, in the form shown in Fig. 1, comprise three lifting units 40, 40' and 40" disposed at intervals under the bottom beam 11, there being three corresponding lifting units for the bottom beam at the other side of the machine, as indicated in Fig. 2. An enlarged detail sectional view of a lifting unit is shown in Fig. 6. As shown, this unit comprises a generally horizontal cylindrical housing 41 supported by a base 42, this housing having removable end members at 43 adapted to provide suitable bearing supports 44 for a drive-shaft 45. As shown, this drive-shaft is supported by means of roller bearings 46 mounted in the bearing supports 44. The drive-shaft 45 within the housing is provided with a pair of eccentric members 46' and 46". These eccentric members are displaced from each other 180°, i. e., their eccentricities are polarized. Each eccentric is also shown as supporting a roller bearing 47 arranged to bear against and actuate one of the pair of vertically-moving plungers 48 and 48'. These plungers project from suitable openings formed in the housing cover 49. In this cover, as illustrated, are interposed about the plungers the sleeves 49'. It is thus seen that as the drive-shaft 45 is rotated, the plungers 48 and 48' reciprocate and execute opposite vertical movement.

For the purpose of imparting vertical movement to the upper and lower frame members, it is seen that each of the plungers 48 and 48' is arranged respectively to impart motion to one of the frame members. As illustrated in Figs. 1 and 2, the plungers 48 impart motion to the core members 18 of the posts and thus raise and lower the top beams and the upper frame member, while the plungers 48' bear directly against the bottom beams 11 and thus impart motion to the lower frame member. The drive-shaft 45 is made mechanically continuous through the three lifting units by means of suitable shaft couplings 50. The lifting units on the two sides of the machine thus have their drive-shafts 45 disposed substantially parallel, in order that the two sides of the frame may rise and fall at the same time, i. e., synchronously. As here shown this synchronous drive of the two shafts 45 is insured by means of a transverely-disposed driving-shaft 51 which is driven by the motor 52 disposed under the machine. As shown in Fig. 2, the shaft 51 at each end is coupled to drive the shafts 45 through bevelled gearing indicated at 53. The motor 52 may be coupled for driving the shaft 51 in any convenient manner; but is preferably accomplished through reduction gearing, the housing for which is shown at 54. A suitable base or bed 55 is shown below the drying machine to which the lifting units may be secured, the bearings for the shaft 51, and the mounting for the motor.

The casings for the motor reduction gearing and the lifting units, as here shown, are adapted to be filled with lubricant so as to insure the proper working of the moving parts. Forced circulation of the lubricant is preferred, and the form of device, shown in Fig. 6, has means provided to this end. The means shown comprises a reciprocating pump unit 56 communicating through the bottom of the housing and having a pump plunger 57 adapted to be actuated from an eccentric within the housing. The lubricant thus pumped makes an exit through the pipe connection 58 which has a check valve 58′, preventing back flow, disposed therein. The pipe connection 58, as indicated in Fig. 7, is arranged to reintroduce the lubricant to the housing at an elevated point so that gravity may be utilized to secure the downward flow of the lubricant, and thus produce circulation.

*The actuating means*

The actuating means which causes the rollers 30 to oscillate is arranged to operate in suitable timed relation with that of the lifting means, in order that the rollers may be oscillated to advance the sheet-material only at the times when the same is not gripped by the platens. This timed relation is best secured by means of the provision of direct mechanical coupling to the driving shaft of the lifting means. For this purpose the machine here shown is provided with a pedestal frame 60 having a vertically-reciprocating rack or plunger 61 arranged to oscillate a plurality of driving sprockets 62 mounted in the pedestal frame, these driving sprockets having passed about them the sprocket chains 38 in the manner of endless belts. The reciprocation of this rack, in consequence, effects the oscillation of the rollers 30. The actuation of the rack 61 in proper timed relation with the movement of the lifting units is here insured by providing the shaft 45 with a cam adapted to effect the reciprocation of the rack. As shown in Fig. 1, this cam operates in a housing 63 disposed between the lifting unit 40″ and the base 64 which supports the pedestal. The details of the pedestal construction are shown more clearly in Figs. 8 to 12, while Figs. 13 to 17 show the details of the cam-actuating mechanism for the rack 61. In Fig. 13 the shaft 45 is shown entering the housing 63 at one side and has keyed to its inner end the cam 65, the form of which is shown in end elevation in Fig. 15. This cam bears upon and reacts against a pair of anti-friction sheaves or rollers 66 rotatively mounted at opposite ends of the vertically-moving plunger 67 which is disposed to execute reciprocating movement in the housing 63.

To reciprocate the rack 61, the plunger 67 is mechanically linked thereto. It is preferred, however, that this mechanical connection shall afford means whereby the amplitude of the reciprocation imparted by the plunger 67 to the rack 61 may be varied, since this enables the angular displacement, through which the driving sprockets 62 (and hence the rollers 30) may be turned, to be varied. The means for varying the amplitude of the reciprocating movement imparted to the rack 61 comprises a lever 68 pivotally connected at its ends with the plunger 67 and with the rack 61, respectively, the lever being provided with a movable fulcrum. The details of the movable fulcrum construction and the connection of the lever with the rack 61 are shown in Figs. 8 to 12, where the movable fulcrum is secured by mounting a sliding cradle 69 upon the lever which has a laterally projecting trunnion 70 that is pivotally mounted in the sliding block 71. This block has a dove-tail spline 72 adapted to slide in a groove corresponding thereto formed in the pedestal base 64. Thus the fulcrum for the lever 68 is varied by sliding the block 71 in the groove 73. This sliding movement for the block is effected by means of the screw 74, the screw being passed into the lower portion of the block and has a nut 75 secured to the end thereof, and adapted to turn freely in a recess in the block formed therefor, the screw being also provided with a collar 76 on the outside to bear against the block. This screw turns in a nut 77 formed at the front end of the slot 73 and secured in the base 64. A hand wheel 78 is shown for actuating the screw, and thereby securing manual adjustment of the lever fulcrum for varying the amplitude of the rack reciprocation and of roller-oscillation.

In order that the block 71 may be secured in the position to which it is adjusted by the hand wheel 78, a locking mechanism is provided of any convenient form, for example, a wedge member 79 adapted to engage slidably with the underside of the block. This wedge is actuated and slid back and forth by the cam device 80 which comprises a hand-rotated shaft mounted transversely in the base 64 having an eccentrically-disposed pin 80' adapted to engage with a vertical slot in the wedge.

In order that the lever 68, when oscillated, shall not transmit a lateral component to the rack 61, there is employed a pair of links 81 which are secured at their lower end by a pin passing through the end of the lever, and are secured at their upper ends to the cross-head 82, that is secured on the reduced end 83 of the rack 61 (see Fig. 11). The rack 61 in the pedestal 60, as shown in Fig. 10, is adapted to slide on a way 84 mounted on a removable side plate 85 of the pedestal. Meshing with the teeth of the rack 61 are the gears 86 pivoted on short transverse shafts 87 that are mounted in suitable bearings 88 formed in the sides of the pedestal. On the shafts, in addition to the gears 86, are the driving sprockets 62 arranged to be turned by and driven from the gears. The pedestal is also provided with openings 60' in the wall opposite the teeth of the sprockets for permitting the passage of the sprocket chains 38 therefrom into the driving machine for oscillating the rollers 30.

The sheet-supplying means

To supply the drying machine with sheet-material to be dried in its several decks, the machine is provided with suitable sheet-supplying or feeding means at the intake end (here shown on the left of Fig. 1). The sheet-feeding means, as here illustrated, is adapted to support at various elevations the sheet-material to be dried in the machine in a manner such that these elevations correspond with the several decks in the drying machine. This is achieved by providing a plurality of tables or table-like supporting surfaces stationarily supported at proper elevations at the intake end of the machine. To this end, a pedestal 90 is rigidly secured at the intake end of the machine and forms a support for a plurality of angle bars 91 disposed in parallel relation one above the other at each side of the machine. These angle bars are supported at their other ends by means of vertical columns or struts 92. These angle bars serve as supports for a plurality of rollers 93 which are mounted so as to rotate on their bearings and be driven with a sprocket chain for the driving sprockets 93', secured on their far ends, as shown. The form of bearing here preferred is illustrated in Fig. 20 which shows roller bearings 94 employed for this purpose. The roller surfaces provide a table-like support for the sheet-material to be fed at the intake end of the drying machine.

The pedestal 90 is arranged to support, in addition to the feed tables, a tensioning mechanism which keeps the sprocket chains which oscillate the rollers 30 in the drying machine under proper tension, these sprocket chains being in the form of endless belts, as previously mentioned, requiring support at the intake end of the drying machine, as well as at the outlet end of the machine. For this purpose a plurality of idler sprockets, as indicated at 95, are mounted one above the other in the pedestal 90, these sprockets being resiliently held against the pull of the chains 38. The details of the support of these sprockets are shown in Fig. 21. Here the frame of the pedestal is shown as made of plates arranged in the form of a U-shaped member in cross-section. Within these plates slides a second U-shaped member 96 which supports the shaft 97 on which a sprocket 95 turns, these sprockets being preferably supported with as little friction as possible, and are here shown as having roller bearings 98. The ends of each shaft 97 project beyond the sides of its supporting U-member 96 and are adapted to work in elongated slots 99 formed in the sides of the frame 90. The supporting U-members 96 are thus permitted to have a limited lateral movement in the main U-member of the pedestal 90, the limit of this movement being determined by the length of the slots 99 against the ends of which the shafts 97 may contact. Passing through perforations in the base portions of the U-members of the pedestal and of the sprocket support, respectively, is a rod 100 which has means 101 at the outer end of the rod to serve as a reacting abutment against the outside wall of the pedestal 90. The other end of the rod is similarly provided with an abutment 102 between which and the base of the inner U-member 96 is interposed a helical spring which when fully expanded pushes the U-member 96 back into the U-portion of the pedestal 90 so that their base members are substantially in contact. It will be understood that a similar construction is adapted for supporting each idler sprocket, and that the weight and tension on the sprocket chains passing over these idler sprockets pull outwardly upon their U-members 96 and compress the springs 103. The abutments 101 are shown as comprising a pair of nuts, the position of which may be varied on each rod 100 so as to vary the tension on the springs 103 and thus vary the tension on the sprocket chains passing over the idler sprockets 95.

To effect the vertical alignment of the pedestals 60 and 90, adjusting means is provided in the form of wedges; for example those indicated symbolically by broken lines in Fig. 1 at 105 and 106, respectively. The construction of these wedges is better shown in Fig. 8. Here it is seen that a triangular or wedge-shaped body 105 is arranged to slide upon the inclined body 107 which is secured to the bed plate 108 disposed under the base of the pedestal. The wedge member 105 is adapted to be drawn up by means of the screw 109 which has a head projecting on the outside of the base 64 sufficiently to enable it to be gripped by a wrench or other manipulating tool. By drawing up on the wedges 105 and 106, the pedestals 60 and 90 are made to fit firmly in their bed plates and further movement of the wedges produces adjustment of the vertical alignment of the pedestals, as can readily be seen. Similar adjusting wedges are indicated at 110 and 111 in Fig. 1 for the lifting units and their driving means by which the alignment of shaft 51 is secured.

Fig. 1 also shows, in addition to the banks of rollers 30 disposed between the platens, a bank of rollers designated 130 at each end of the drying machine interposed between the machine and the pedestals at the ends. These banks of rollers initiate and conclude the feeding movement of each strip of sheet-material fed through the drying machine. Consequently, these banks are preferably no different from those in the body of the machine and partake of the same movement, and may be supported from actuating posts by a suitable supporting mechanism 131 which is substantially a counter-part of one-half of that comprising the supporting bar 36 and its bearing 35, shown in Fig. 18.

The actuation of the rollers 93 is accomplished by the provision of ratchet-sprockets 132, on the roller ends adjacent the chains 38, of the rollers 93 in each table which lie at the ends adjacent the intake end of the drying machine. These ratchet-sprockets may be of any suitable form, for example, that shown in U. S. patent to Merritt et al. No. 1,601,316, patented September 28, 1926. Their arrangement at the end of each supporting table enables the ratchet-sprockets to serve as additional supports for the chains 38, as well as be driven therefrom. The chains at the other ends of the rollers 93 are also endless-belt variety and actuate simultaneously all of the rollers 93 in a table to effect the advance of the sheet-material. The feed of the ratchet-sprockets 132 is such as to impart to the rollers 93 in a table a movement such as to advance the sheet-material only in those decks for which the platens in the first bank are "open" and to remain dormant for those decks in which the platens are closed.

*The heating means*

In the drying machine of the present invention the platens, as indicated above, are conveniently heated by passing therethrough a fluid-heating medium, such as live steam. For this purpose the upper and lower frame members are arranged to carry headers to supply live steam and withdraw the condensate respectively from the platens. It will be understood that these headers have been removed from Fig. 1 in the interest of clearness, their showing in Fig. 2 being deemed sufficient for the purpose of the present disclosure. As shown in Fig. 2, a header or manifold 120 is disposed above and supported by the left-hand top beams 10 of the frame. A similar header or manifold 121 is shown disposed above the right-hand top beam 10, not supported therefrom, but has supporting struts 124' which are adapted to extend between the channel members of the top beam and be supported by the outside plates 16—17 of the posts 15. Consequently, the header 121 participates in the motion of the bottom beams 11 of the frame. From the header 120 leads a live-steam supply pipe 122 which extends transversely across the full width of the machine and bends downwardly at 123 as a branch pipe 124, which leads to a pair of platens in the manner shown in Fig. 2$^b$, these platens being supported by the cores 18 in the bank; similar pipes lead to each alternate platen in the bank, there being similar live steam piping with branch piping for each bank in the drying machine.

On the left-hand side of Fig. 2 branch pipes 125 similar to the branch pipes 124 are seen to lead from the same platens that the branch pipes 124 enter. These branch pipes lead to and enter a collecting pipe 126 feeding a header or manifold 127 disposed under the lower frame member of the drying machine and which is adapted to be suspended from the core members of the posts by a bracket 128 (top portion of which is omitted in the interest of clearness), in which manifold 127 will collect the condensate from the live-steam introduced to the platens by the branch pipes 124. From this it will be seen that the supply and collecting pipes for the steam that are associated with the platens in a bank which are supported on the core members of the posts 15 are likewise supported by and move with the core members. In a similar manner a live steam pipe 123' leads from the header or manifold 121 to supply live steam to the platens which are carried by the outside members 16 and 17 of the posts, and a collecting pipe 126' leads to a header or manifold 129 disposed beneath the lower frame member of the machine and partakes of the movement of the outside plates of a post. Consequently, it is seen that the pipe for this set of platens which moves with the outside plates is also supported by and moves with the outside plates of the posts.

The transverse portion of the steam supply pipes, as indicated at 122, is seen, however, to impart a certain amount of resiliency to the pipe system, and since the platens rest upon the key members and are not rigidly secured thereto, they are susceptible of slight vertical movement in order to accommodate themselves to varying thicknesses of the sheet-material being dried, and the like. It will also be seen that by mounting the headers or manifolds in the manner described, the use of flexible piping and of slip joints are thereby avoided. Consequently, the machine can be kept clean and dry, and the heating medium conserved to the full.

Operation

The drying machine of the present invention, as indicated above, is adapted to treat progressively sheet-material, drying the same and feeding it with a continuous intermittent movement in at one end of the machine and out at the other, all the sheet-material passing in the same general direction so that the machine may be adapted to meet modern factory conditions of production and produce a product which may be conveyed from the machine at one point with a continuous straight-ahead movement. The green sheet-material or veneer to be dried is placed upon the feed table, shown on the left-hand end of the feed table in Fig. 1, and is pushed forwardly by contact with the feed rollers in the openings as they occur at the initial bank of the feeding rollers, shown at 130. This bank of rollers partakes of the movement described in connection with the rollers, and illustrated in Fig. 2ª. For example, let it be assumed that when openings occur between the second and third rollers from the top, as indicated between the rollers $b$ and $c$ in the middle column of Fig. 2ª, the feed rollers would push the sheet-material into such opening. The sheet-material which has already been pushed between the rollers $a$ and $b$ and $c$ and $d$ during this period are in contact with and advance the sheet-material to the right, while the upper and lower frame members are in the "near" position. The whole machine, of course, is actuated from the motor shown at 52, which, when once started, is kept constantly running while the drying machine is in operation. On account of the reduction gearing employed the plungers in the lifting units move slowly but continuously, and thus gradually effect a movement of the upper and lower frame members from the "near" to the "far" position of the frame members when the initial feeding rollers in the bank 20 have changed their position to that shown in the right-hand column of Fig. 2ª. In this position of the rollers their direction of oscillation and rotation is reversed, and the sheet-material formerly introduced between the other rollers is now fed forwardly between a pair of open platens in the initial bank. The top and bottom sheets which were being advanced by the rollers $a$—$b$ and the rollers $c$—$d$ in the middle column of Fig. 2 are now held firmly between the two top platens in the initial bank and the two immediately below. The sheet-material between these platens continues to be held and treated by heat and pressure for a period of time corresponding to that which it takes an eccentric in a lifting unit to execute in one-half of a revolution. During the other one-half of the revolution the upper and lower frame members are moved from the "far" position again to the "near" position, and the sheet-material which was before introduced between the rollers $b$ and $c$ is now gripped by the second and third platens for treatment with heat and pressure, while the sheet-material which before was under treatment is now advanced by oscillation of the rollers 30; the oscillation of the rollers which effects this advance being produced by the reciprocation of the rack 61 which is moved by the lever 58 driven from the motor 52 through the mechanical connections above described. As the plungers continue their relatively slow but continuous reciprocating movements, the sheet-material is advanced intermittently but progressively through the drying machine, not only in the top two decks which correspond to the illustrations in Fig. 2ª, but in all the decks in the drying machine, and are ejected at the outlet end of the machine with same intermittent but progressive movement which characterizes the feed of this drying machine. An attendant, consequently, can collect the whole output of this drying machine from one end and convey it away by any suitable means in the desired manner.

The step distance which the sheet-material advances in the machine is, of course, determined by the angular movement which a roller makes during each one-half oscillation. This angular movement is, of course, determined, as explained above, by the distance through which the rack 61 travels in its reciprocating movement, and this distance is adjusted by turning the hand wheel 78. The drying time is thus variable.

Since the platens are free to execute a limited vertical movement, as explained above, to accommodate themselves to varying thicknesses of sheet-material to be treated, and since the distance that the sheet-material is advanced through the machine for each reciprocation of a plunger in the lifting means can be adjusted, at will, it is seen that the drying machine of the present invention can be employed to treat substantially any kind of sheet-material at substantially any desired rate.

The machine as here constructed, employing substantially anti-frictional bearings for all moving parts and through lubrication therefor, is seen to operate with substantially a minimum consumption of energy.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described our invention, what we claim as new and desire to secure by Letters Patent is:

1. In a drying machine, in combination, relatively movable frame members, drying means supported by said frame members and adapted to be moved by said frame members to grip and release alternately sheet material to be dried, and means adapted intermittently to advance the released sheet material through said machine in but one direction.

2. In a drying machine, in combination, relatively movable frame members, drying means supported by said frame members and adapted to be moved by said frame members to grip and release alternately sheet material to be dried, and feeding rollers adapted to be moved in contact with the released sheet material for advancing the same through the machine in one direction.

3. In a drying machine, in combination, relatively movable frame members, drying means supported by said frame members and adapted to be moved by said frame members to grip and release alternately sheet material to be dried, feeding rollers adapted to be moved into contact with the released sheet material, and actuating means for said feeding rollers for driving the same to advance the sheet material through said machine in one direction only.

4. In a drying machine, in combination, relatively movable frame members, drying means supported by said frame members and adapted to be moved by said frame members to grip and release alternately sheet material to be dried, and oscillating rollers adapted to be moved into contact with the released sheet material for advancing the same through the machine in one direction only.

5. In a drying machine, in combination, relatively movable frame members, drying means supported by said frame members and adapted to be moved by said frame members to grip and release alternately sheet material to be dried, feeding rollers pivotally supported and adapted to be moved into engagement with the released sheet material, and actuating means for oscillating said rollers through a predetermined portion of a revolution to advance the sheet material by a given step through the machine in one direction only.

6. In a drying machine, in combination, distensible frame members having means for reciprocating the same oppositely, a bank of interleaved drying platens supported by said frame and arranged to engage with alternate strips of sheet material passed between said interleaved platens, means for actuating said reciprocating means whereby said platens alternately engage and release each strip of sheet material passed between the same, and means to advance in one direction by a given step the sheet material upon each release by the platens.

7. In a drying machine, in combination, distensible frame members having means for reciprocating the same oppositely, a bank of interleaved drying platens supported by said frame and arranged to engage with alternate strips of sheet material passed between said interleaved platens, means for actuating said reciprocating means whereby said platens alternately engage and release each strip of sheet material passed between the same, feeding rollers adapted to be moved into engagement with sheet material as released by said platens for advancing said sheet material through said machine in one direction only.

8. In a drying machine, in combination, distensible frame members having means for reciprocating the same oppositely, a bank of interleaved drying platents supported by said frame and arranged to engage with alternate strips of sheet material passed between said interleaved platens, means for actuating said reciprocating means whereby said platens alternately engage and release each strip of sheet material passed between the same, feeding rollers mounted on said frame and arranged to be moved thereby into engagement with the sheet material as released by the platens, and means for actuating said feeding rollers and said reciprocating means.

9. In a drying machine, in combination, distensible frame members having means for reciprocating the same oppositely, a bank of interleaved drying platens supported by said frame and arranged to engage with alternate strips of sheet material passed between said interleaved platens, means for actuating said reciprocating means whereby said platens alternately engage and release each strip of sheet material passed between the same, oscillating feeding rollers mounted on said frame and adapted to be moved thereby into engagement with said sheet material as released by said platens, and means for oscillating said rollers in a direction to cause an advance of said sheet material by a predetermined step through said machine in one direction; said last-named means having driving connections adapted to drive said reciprocating means.

10. In a drying machine, in combination, distensible frame members having means for reciprocating the same oppositely, a bank of interleaved drying platens supported by said frame and arranged to engage with alternate strips of sheet material passed between said interleaved platens, means for actuating said reciprocating means whereby said platens alternately engage and release each strip of sheet material passed between the same, rollers supported by said frame and adapted to be moved thereby, said rollers being disposed oppositely to said platens and arranged to partake of the motion of the platen in the level above the same whereby a pair of rollers is adapted to engage with the sheet material when released by a pair of platens, and means for actuating said rollers for causing the same to impart a limited advancing movement through said machine upon each release by the platens.

11. In a drying machine, in combination, distensible frame members having means for reciprocating the same oppositely, a bank of interleaved drying platens supported by said frame and arranged to engage with alternate strips of sheets material passed between said interleaved platens, means for actuating said reciprocating means whereby said platens alternately engage and release each strip of sheet material passed between the same, and rollers adapted to be oscillated mounted upon said frame and adapted to be moved thereby, said rollers being disposed oppositely to said platens and arranged to partake of the motion of the platen in the level above whereby the movement of said frame moves a pair of rollers into engagement with a strip of sheet material as released by the movement of the platens, and means for oscillating said rollers through a predetermined angular displacement whereby the sheet material is advanced intermittently in stages through said machine.

12. In a drying machine, in combination, distensible frame members adapted to execute opposite reciprocating movements, a plurality of interleaved drying platens supported in banks arranged at intervals along said frame members, said platens being adapted to be moved alternately into engagement with the platens above and below the same by the reciprocating movement of said frame members, the open spaces between said engaging platens being arranged to be in register to provide decks for the passage of sheet material continuously through said machine, banks of feeding rollers disposed between said platen banks, said feeding rollers being supported by said frame and adapted to have reciprocating movements imparted thereto, said rollers being disposed oppositely to the platens and arranged to partake of the motion of the platens in the deck above whereby said rollers are adapted to be moved into engagement with the sheet material released by said platens, means for reciprocating said frame members, and means for simultaneously driving said reciprocating means and said feeding rollers.

13. In a drying machine, in combination, distensible frame members adapted to execute opposite reciprocating movements, a plurality of interleaved drying platens supported in banks arranged at intervals along said frame members, said platens being adapted to be moved alternately into engagement with the platens above and below the same by the reciprocating movement of said frame members, the open spaces between said engaging platens being arranged to be in register to provide decks for the passage of sheet material continuously through said machine, banks of feeding rollers disposed between said platen banks, said feeding rollers being supported by said frame and adapted to have reciprocating movements imparted thereto, said rollers being disposed oppositely to the platens and arranged to partake of the motion of the platens in the deck above whereby said rollers are adapted to be moved into engagement with the sheet material released by said platens, means for causing a partial rotation of said rollers through a predetermined angular displacement when engaging with the sheet material for one position of said platens and for causing said rollers to be rotated through an equal and opposite angular displacement when in engagement with the sheet material for the alternate position of said platens, and means for driving said reciprocating means and for causing said rollers to execute their equal and opposite angular displacements in a timed relation to said reciprocating movement of said frame.

14. In a drying machine, in combination, distensible frame members adapted to execute opposite reciprocating movements, a plurality of interleaved drying platens supported in banks arranged at intervals along said frame members, said platens being adapted to be moved alternately into engagement with the platens above and below the same by the reciprocating movement of said frame members, the open spaces between said engaging platens being arranged to be in register to provide decks for the passage of sheet material continuously through said machine, banks of feeding rollers disposed between said platen banks, said feeding rollers being supported by said frame and adapted to have reciprocating movements imparted thereto, said rollers being disposed oppositely to the platens and arranged to partake of the motion of the platens in the deck above whereby said rollers are adapted to be moved into engagement with the sheet material released by said platens, means for oscillating said feeding rollers through equal and opposite angular displacements whereby the sheet material alternately released by said platens is advanced by a step-by-step motion in one direction through said machine, means for reciprocating said frame members, and means for driving said rollers, oscillating means and said reciprocating means in proper timed relation.

15. In a drying machine, in combination, relatively movable distensible frame members having supporting posts disposed at intervals between the same, said posts having sliding members adapted to execute opposite motions, interleaved platens disposed in banks and secured alternately to the sliding members on said posts on opposite sides of said machine, pivoted rollers disposed oppositely to said platens between the banks thereof and supported by the sliding members of said posts, each said roller being arranged to receive the reciprocating motion of the platens in the level above the same, the platen surfaces in each bank being arranged to provide a continuation of the platen surfaces in the adjacent banks whereby decks for the continuous treatment of sheet material through said machine are provided, means for actuating said rollers to feed the sheet material through said machine by a step-by-step movement simultaneously in alternate decks, means for reciprocating said frame members, and means for driving said roller actuating means and said reciprocating means in desired timed relation.

16. In a drying machine, in combination, relatively movable distensible frame members having supporting posts disposed at intervals between the same, said posts having sliding members adapted to execute opposite motions, interleaved platens disposed in banks and secured alternately to the sliding members on said posts on opposite sides of said machine, pivoted rollers disposed oppositely to said platens between the banks thereof and supported by the sliding members of said posts, each said roller being arranged to receive the reciprocating motion of the platens in the level above the same, the platen surfaces in each bank being arranged to provide a continuation of the platen surfaces in the adjacent banks whereby decks for the continuous treatment of sheet material through said machine are provided, means for oscillating said rollers through limited clockwise and counterclockwise angular displacements whereby sheet material in alternate decks is simultaneously advanced through a given step, the sheet material not engaged by said rollers being under simultaneous treatment between engaging platens, said means causing the simultaneous movement on the previously dried sheet material by a similar step when the rollers are moved to alternate position, means for reciprocating said frame members, and means for driving said reciprocating means and said roller oscillating means in desired timed relation.

17. In a drying machine, in combination, relatively movable distensible frame members having supporting posts disposed at intervals between the same, said posts having sliding members adapted to execute opposite motions, interleaved platens disposed in banks and secured alternately to the sliding members on said posts on opposite sides of said machine, pivoted rollers disposed oppositely to said platens between the banks thereof and supported by the sliding members of said posts, each said roller being arranged to receive the reciprocating motion of the platens in the level above the same, the platen surfaces in each bank being arranged to provide a continuation of the platen surfaces in the adjacent banks whereby decks for the continuous treatment of sheet material through said machine are provided, means for heating said platens, means for actuating said rollers to advance the sheet material in the several decks with a step-by-step movement, means for reciprocating said frame members, and means for driving said reciprocating means and said roller-actuating means in desired timed relation.

18. In a drying machine, in combination, relatively movable distensible frame members having supporting posts disposed at intervals between the same, said posts having sliding members adapted to execute opposite motions, interleaved platens disposed in banks and secured alternately to the sliding members on said posts on opposite sides of said machine, pivoted rollers disposed oppositely to said platens between the banks thereof and supported by the sliding members of said posts, each said roller being arranged to receive the reciprocating motion of the platens in the level above the same, the platen surfaces in each bank being arranged to provide a continuation of the platen surfaces in the adjacent banks whereby decks for the continuous treatment of sheet material through said machine are provided, sheet feeding and supporting means disposed independently of said frame members at one side of said machine for supplying sheet material in the several decks, means for actuating said rollers for intermittently advancing simultaneously the sheet material in alternate decks in one direction, means for reciprocating said frame members, and means for driving said actuating means and said reciprocating means in desired timed relation.

19. In a drying machine, in combination, relatively movable distensible frame members having supporting posts disposed at intervals between the same, said posts having sliding members adapted to execute opposite motions, interleaved platens disposed in banks and secured alternately to the sliding members on said posts on opposite sides of said machine, pivoted rollers disposed oppositely to said platens between the banks thereof and supported by the sliding members of said posts, each said roller being arranged to receive the reciprocating motion of the platens in the level above the same, the platen surfaces in each bank being arranged to provide a continuation of the platen surfaces in the adjacent banks whereby decks for the continuous treatment of sheet material through said machine are provided, sheet feeding and supporting means disposed at the intake end of said frame members and adapted to supply sheet material to the several decks of said machine, means for oscillating said feeding rollers whereby sheet material in alternate decks is simultaneously advanced by the oscillation of the rollers in one direction, the remaining sheet material being stationary, said stationary sheet material being similarly advanced upon the oscillation of said rollers in the opposite direction, means for reciprocating said frame members, means for driving said oscillating means and said reciprocating means in proper timed relation, and means for heating said platens.

20. In a drying machine adapted for the intermittent but continuous advance of sheet material through the same, a pair of rollers adapted to be reciprocated into and out of engagement with said sheet material, said rollers having driving sprockets and an endless chain engaging therewith for causing said rollers to execute alternately equal and opposite angular displacements.

21. In a drying machine adapted for the continuous and intermittent treatment of sheet material, a pair of feeding rollers adapted to be reciprocated into and out of engagement with said sheet material, driving sprockets for said rollers, an endless sprocket-chain adapted to be in driving engagement with similar portions of each of said sprockets, an idler sprocket for said chain being provided at one end and a driving sprocket being provided for said chain at the other end, and means for imparting an oscillating movement to said driving sprocket at the end of said chain.

22. In a drying machine having movable platens adapted for the intermittent and continuous treatment of sheet material, a pair of feeding rollers adapted to be reciprocated into and out of engagement with sheet material passing through said platens, sprockets on said rollers, a stationary pedestal disposed at one end of said machine and supporting an idler sprocket, a second pedestal supported at the other end of said machine and supporting a driving sprocket, an endless chain passing over said idler sprocket and said driving sprocket arranged to engage with similar portions of said sprockets on said rollers, a driven reciprocating member in said second pedestal arranged to actuate said driving sprocket, and a driven reciprocating plunger secured to said second pedestal and arranged to actuate said driven member.

23. In a drying machine having movable platens adapted for the intermittent and continuous treatment of sheet material, a pair of feeding rollers adapted to be reciprocated into and out of engagement with sheet material passing through said platens, sprockets on said rollers, a stationary pedestal disposed at one end of said machine and supporting an idler sprocket, a second pedestal disposed at the other end of said machine and suporting a driving sprocket, an endless chain passing over said idler sprocket and said driving sprocket arranged to engage with similar portions of said sprocket on said rollers, a driven reciprocating member in said second pedestal arranged to actuate said driving sprocket, a reciprocating rack operatively supported in said second pedestal and adapted to actuate said driving sprocket, means for reciprocating said platens into and out of engagement with said sheet material being dried, and a lever for mechanically coupling the means for reciprocating said platens with said reciprocating rack.

24. In a drying machine having movable platens adapted for the intermittent and continuous treatment of sheet material, a pair of feeding rollers adapted to be reciprocated into and out of engagement with sheet material passing through said platens, sprockets on said rollers, a stationary pedestal disposed at one end of said machine and supporting an idler sprocket, a second pedestal disposed at the other end of said machine and supporting a driving sprocket, an endless chain passing over said idler sprocket and said driving sprocket arranged to engage with similar portions of said sprocket on said rollers, a driven reciprocating member in said second pedestal arranged to actuate said driving sprocket, a reciprocating rack operatively supported in said second pedestal and adapted to actuate said driving sprocket, means for reciprocating said platens into and out of engagement with said sheet material being dried, and a lever for mechanically coupling the means for reciprocating said platens with said reciprocating rack; said lever having a movable fulcrum whereby the amplitude of the reciprocation imparted to said rack may be varied.

25. In a drying machine, in combination, relatively movable distensible upper and lower frame members, a bank of interleaved drying platens arranged to have alternate ones thereof supported respectively from said upper and lower frame members and a plurality of units arranged for supporting said frame members having means for reciprocating said frame members, each of said units comprising a housing, a pair of plungers disposed therein, one plunger being adapted to actuate the upper frame member, the other plunger having a movement opposite to that of the aforesaid plunger and being adapted to actuate the lower frame member, and a driving shaft journalled in said housing having polarized eccentrics arranged to impart reciprocating motions to said plungers, the respective reciprocations differing in phase relation by substantially 180°.

26. In a drying machine, in combination, relatively movable upper and lower distensible frame members, a bank of drying platens mounted therein and having alternate ones thereof supported respectively by said upper and lower frame members, feeding rollers disposed in said frame adjacent to said platens, alternate ones thereof being supported respectively by said upper and lower frame members, said rollers being so arranged as to partake of the motion of the platen in the lever above the same, means for reciprocating said frame members comprising a plurality of lifting units disposed under each side of the same, each unit comprising a housing having a pair of reciprocating plungers, one plunger in each housing being adapted to impart motion to the lower frame member, the other plunger being adapted to impart motion to the upper frame member, a pair of eccentrics in said housing having their eccentricities polarized, a driving shaft in each unit adapted to actuate said eccentrics, said shafts being mechanically coupled, means for driving the same synchronously, a reciprocating member connected to oscillate said feed rollers whereby an intermittent but progressive feed of the sheet material being treated is effected through said machine, and means for connecting in proper timed relation said driving means and said roller actuating means.

27. In a drying machine, in combination, relatively movable upper and lower frame members, banks of interleaved drying platens having alternate ones thereof supported respectively by said upper and lower frame members and means for supplying a heating medium thereto, comprising a pair of manifold headers disposed lengthwise above the upper frame members, one header being supported from the upper frame member, the other header being supported by the lower frame member, pipe connections leading from the header supported by the upper frame member having branches leading to the platens supported by said upper frame member and pipe connections leading from the other header having branches communicating with the platens supported by the lower frame member and a pair of receiving headers disposed lengthwise below the lower frame member, one header being supported by the lower frame member, the other of said second pair of headers being supported by the upper frame member, branch connections leading from the other ends of the platens supported by the upper frame member, which branch connections lead to the lower header supported by the upper frame member and other branch connections leading from the platens supported by the lower frame member, said last-named branch connections leading to the lower header supported by said lower frame member.

28. In a veneer drying machine, in combination, a series of platens arranged one above another and having cooperable adjacent gripping- and heating-surfaces, a series of rolls arranged one above another and having cooperable adjacent gripping- and feeding-surfaces, said two series being spaced horizontally, and driving means whereby certain pairs of said platens are caused to grip and heat intermediate material released from all said rolls while certain pairs of said rolls grip and feed intermediate material released from all said platens.

29. In a veneer drying machine, in combination, a series of platens arranged one above another and having cooperable adjacent gripping and heating-surfaces, a series of rolls arranged one above another and having cooperable adjacent gripping- and feeding-surfaces, said two series being spaced horizontally, and driving means whereby certain pairs of said platens are caused to grip and heat intermediate material released from all said rolls, while certain pairs of said rolls grip and feed intermediate material released from all said platens and whereby periodically other certain pairs of said platens grip and heat intermediate material released from said first-mentioned certain pairs of rolls while certain other pairs of said rolls grip and feed intermediate material released from said first mentioned certain pairs of said platens.

30. In a veneer drying machine, in combination, a series of platens arranged one above another and having cooperable adjacent gripping- and heating-surfaces, a series of rolls arranged one above another and having cooperable adjacent gripping- and feeding-surfaces, said two series being spaced horizontally, and driving means whereby certain pairs of said platens are caused to grip and heat intermediate material released from all said rolls, while certain pairs of said rolls grip and feed intermediate material released from all said platens, and whereby periodically other certain pairs of said platens grip and heat intermediate material released from said first-mentioned certain pairs of rolls while certain other pairs of said rolls grip and feed intermediate material released from said first-mentioned certain pairs of said platens, all of said certain pairs of rolls feeding intermediate material in one direction.

31. In a veneer material machine, in combination, a series of platens arranged one above another and having cooperable adjacent gripping- and heating-surfaces, a series of rolls arranged one above another and having cooperable adjacent gripping- and feeding-surfaces, said two series being spaced horizontally, driving means whereby certain pairs of said platens are caused to grip and heat intermediate material released from all said rolls, while certain pairs of said rolls grip and feed intermediate material released from all said platens and whereby periodically other certain pairs of said platens grip and heat intermediate material released from said first-mentioned certain pairs of rolls while certain other pairs of said rolls grip and feed intermediate material released from said first-mentioned certain pairs of said platens, all of said certain pairs of rolls feeding intermediate material in one direction, and means whereby the step feed of material by said rolls may be varied.

32. A machine for feeding and drying a plurality of vertically spaced veneer sheets, including, in combination, a series of drying platens each being relatively movable toward and away from each adjacent platen, a series of feeding elements horizontally spaced from said platens and each being relatively movable toward and away from each adjacent element, means to effect drying action of certain of said platens on one of said sheets of veneer while releasing another adjacent sheet, and means to effect feeding action of certain of said elements on the platen-released sheet while releasing the platen-drying sheet.

33. A machine for feeding and drying a plurality of vertically spaced veneer sheets, including, in combination, a series of drying platens each being relatively movable toward and away from each adjacent platen, a series of feeding elements horizontally spaced from said platens and each being relatively movable toward and away from each adjacent element, means to effect drying action of certain of said platens on one of said sheets of veneer while releasing another adjacent sheet, means to effect feeding action of certain of said elements on the platen-released sheet while releasing the platen-drying sheet, and means whereby said elements feed said sheets in the same direction.

In testimony whereof we affix our signatures.

LOUIS G. MERRITT.
ERICSSON H. MERRITT.
RICHARD W. STANLEY.